(12) United States Patent
Tsvetkov et al.

(10) Patent No.: US 8,560,004 B1
(45) Date of Patent: Oct. 15, 2013

(54) SENSOR-BASED ACTIVATION OF AN INPUT DEVICE

(75) Inventors: Igor Tsvetkov, Pittsburgh, PA (US); Michael Andrew Sipe, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/601,731

(22) Filed: Aug. 31, 2012

(51) Int. Cl.
*H04M 1/00* (2006.01)

(52) U.S. Cl.
USPC ............. 455/550.1; 455/466; 455/456.1; 310/328; 345/169; 345/173; 345/156

(58) Field of Classification Search
USPC ........ 455/410, 411, 556.1, 550.1, 466, 456.1; 310/328; 345/169, 173, 156, 168, 157; 342/357.31, 457; 340/5.74, 8.1; 709/223
See application file for complete search history.

(56) References Cited

U.S. PATENT DOCUMENTS

| | | | |
|---|---|---|---|
| 6,098,118 A | 8/2000 | Ellenby et al. | |
| 6,452,494 B1 | 9/2002 | Harrison | |
| 6,529,144 B1 | 3/2003 | Nilsen et al. | |
| 7,159,194 B2 | 1/2007 | Wong et al. | |
| 7,498,951 B2 | 3/2009 | Wardimon | |
| 7,558,600 B2 | 7/2009 | Kang | |
| 7,656,393 B2 * | 2/2010 | King et al. | 345/173 |
| 7,688,306 B2 | 3/2010 | Wehrenberg et al. | |
| 7,826,874 B2 | 11/2010 | Fyke | |
| 8,065,508 B2 | 11/2011 | Rubin et al. | |
| 2003/0103091 A1 | 6/2003 | Wong et al. | |
| 2005/0088522 A1 | 4/2005 | Creviston | |
| 2005/0234676 A1 | 10/2005 | Shibayama | |
| 2006/0204232 A1 | 9/2006 | Weinberg et al. | |
| 2007/0004451 A1 | 1/2007 | Anderson | |
| 2007/0036348 A1 | 2/2007 | Orr | |
| 2007/0075965 A1 | 4/2007 | Huppi et al. | |
| 2007/0156364 A1 | 7/2007 | Rothkopf | |
| 2007/0161410 A1 | 7/2007 | Huang et al. | |
| 2007/0259685 A1 | 11/2007 | Engblom et al. | |
| 2008/0140868 A1 * | 6/2008 | Kalayjian et al. | 455/557 |
| 2010/0079395 A1 * | 4/2010 | Kim et al. | 345/173 |
| 2010/0090564 A1 * | 4/2010 | Oh et al. | 310/328 |
| 2010/0302028 A1 | 12/2010 | Desai et al. | |
| 2011/0070864 A1 * | 3/2011 | Karam et al. | 455/411 |
| 2011/0167391 A1 | 7/2011 | Momeyer et al. | |
| 2011/0251892 A1 * | 10/2011 | Laracey | 705/14.51 |

(Continued)

OTHER PUBLICATIONS

Lipphardt, "MUG: Review of the 800si, Mike Lipphardt's Review of the 800si," retrieved from www.sds.com/mug/800si_review.html, accessed on Feb. 22, 2012, 6 pp.

*Primary Examiner* — Mahendra Patel
(74) *Attorney, Agent, or Firm* — Shumaker & Sieffert, P.A.

(57) ABSTRACT

A method can include receiving a first signal from a first sensor of a mobile computing device, where the first signal represents a first action of a user of the mobile computing device. In accordance with this example, the method further includes activating a second sensor of the mobile computing device based at least in part on the first signal. The method additionally can include receiving a second signal from the second sensor, where the second signal represents a second action of the user of the mobile computing device. The method further can include activating an input device of the mobile computing device based at least in part on the first and second signals. In some examples, the method may be implemented by one or more processors of a mobile computing device.

24 Claims, 7 Drawing Sheets

(56) References Cited

U.S. PATENT DOCUMENTS

| | | |
|---|---|---|
| 2011/0312349 A1* | 12/2011 | Forutanpour et al. ......... 455/566 |
| 2012/0075451 A1* | 3/2012 | Raynor ........................... 348/77 |
| 2012/0188376 A1* | 7/2012 | Chatow et al. ................. 348/148 |
| 2012/0235790 A1* | 9/2012 | Zhao et al. .................... 340/5.83 |
| 2012/0278744 A1* | 11/2012 | Kozitsyn et al. .............. 715/764 |

\* cited by examiner

SENSOR-BASED ACTIVATION OF AN INPUT DEVICE

BACKGROUND

A user may activate or otherwise gain access to functionalities of a mobile computing device by "unlocking" the device. In some instances, a mobile computing device may permit unlocking of the device based on authentication information provided by the user. Authentication information may take various forms, including alphanumeric passcodes and biometric information. Examples of biometric information include fingerprints, retina scans, voice samples, and facial images. A mobile computing device may authenticate a facial image input using facial recognition technology.

SUMMARY

In one example, the disclosure describes a method that includes receiving, with one or more processors, a first signal from a first sensor of a mobile computing device, where the first signal represents a first action of a user of the mobile computing device. In accordance with this example, the method further includes activating a second sensor of the mobile computing device based at least in part on the first signal. The method additionally can include receiving, with the one or more processors, a second signal from the second sensor, where the second signal represents a second action of the user. The method further can include activating, with the one or more processors, an input device of the mobile computing device based at least in part on the first and second signals.

In another example, the disclosure describes a mobile computing device that includes one or more processors. In accordance with this example, the one or more processors may be configured to receive a first signal from a first sensor, where the first signal represents a first action of a user of the mobile computing device. The one or more processors also may be configured to activate a second sensor based at least in part on the first signal. Additionally, the one or more processors may be configured to receive a second signal from the second sensor, where the second signal represents a second action of the user of the mobile computing device. The one or more processors may be further configured to activate a camera and a presence-sensitive screen operatively coupled to the mobile computing device based at least in part on the first and second signals. The one or more processors may be configured to output for display, at the presence-sensitive screen, image or video data captured by the camera.

In a further example, the disclosure describes a non-transitory computer-readable storage medium that includes instructions that cause one or more processors perform operations including receiving a first signal from a first sensor of a mobile computing device, where the first signal represents a first action of a user of the mobile computing device. In accordance with this example, the computer-readable storage medium also includes instructions that cause the one or more processors to perform operations including activating a second sensor of the mobile computing device based at least in part on the first signal. The computer-readable storage medium further can include instructions that cause the one or more processors to perform operations including receiving a second signal from the second sensor, where the second signal represents a second action of the user of the mobile computing device. In accordance with this example, the computer-readable storage medium also includes instructions that cause the one or more processors to perform operations including activating a third sensor of the mobile computing device based at least in part on the second signal, the third sensor being different than the first sensor and different than the second sensor. The computer-readable storage medium further can include instructions that cause the one or more processors to perform operations including receiving a third signal from the third sensor, wherein the third signal represents a third action of the user of the mobile computing device. Additionally, the computer-readable storage medium can include instructions that cause the one or more processors to perform operations including activating a camera of the mobile computing device based at least in part on the first signal, the second signal, and the third signal.

The details of one or more examples are set forth in the accompanying drawings and the description below. Other features, objects, and advantages will be apparent from the description and drawings, and from the claims.

DETAILED DESCRIPTION

The disclosure describes techniques for activating an input device of a mobile computing device based on signals from one or more sensors. In some examples, the input device is a camera. The mobile computing device may use the camera to unlock the mobile computing device. For example, the mobile computing device may use an image captured by the camera as an input to a facial recognition authentication mechanism, a fingerprint, a retina scan, or video gesture authentication mechanism. For instance, a mobile computing device may use a facial recognition authentication mechanism to unlock a mobile computing device by capturing an image of a user's face using a camera and comparing the captured image (or aspects of the captured image) to a reference template. A facial recognition authentication mechanism may provide a convenient mechanism for unlocking a device while also providing security by preventing users whose facial features do not match the reference template from unlocking the mobile computing device. The mobile computing device may activate a microphone in the same manner as activating the camera described above. A voice recognition authentication mechanism may compare a voice sample of a user captured with the microphone to a reference template. A voice recognition authentication mechanism may provide a convenient and secure mechanism for unlocking a device.

In some examples, activation of the input device (e.g., the camera, the microphone, etc.) may be a rate-limiting step in the operation of the facial recognition, the fingerprint, the retina scan, the video gesture, or voice recognition authentication mechanism. For example, in some implementations, the input device may not be activated until the user activates a user input mechanism on the mobile computing device, such as a power button, a lock/unlock button, or a button that causes a display of the mobile computing device to turn on and/or off. After receiving a signal that indicates that the user activated the user input mechanism, one or more processors may activate the input device. In some cases, activating the input device may take a non-negligible amount of time, causing the user to wait for the input device to be active before being able to unlock the device.

In accordance with one or more aspects of the disclosure, the mobile computing device may activate the camera in response to signals received from one or more sensors of the mobile computing device that represent actions of the user. The mobile computing device may begin in a locked state. When the mobile computing device is in the locked state, a first sensor of the mobile computing device may receive a first signal. Based on the first signal, the mobile computing device may detect a first action of a user of the mobile computing device. Based at least in part on the first signal, the mobile computing device may activate a second sensor of the mobile computing device. The second sensor of the mobile computing device may have been previously disabled (e.g., in a low power state or an inactive state).

The second sensor may detect a second action of the user of the mobile computing device. The mobile computing device then may activate a camera of the mobile computing device based at least in part on the first and second signals. By activating the camera based on the input of at least two sensors, the techniques of this disclosure may reduce an amount of time the user waits before the camera is active and ready to collect an image of the user's face for use in the facial recognition authentication mechanism (or likewise to collect an image of the user's fingerprint or retina scan for use in a fingerprint, a retina scan, or video gesture authentication mechanism). In some examples, because the second sensor is not activated until the first signal is received from the first sensor, the techniques described herein may reduce power consumption of the mobile computing device, e.g., compared to a mobile computing device in which at least two sensors operate in a higher power state while the mobile computing device is in the locked state.

Responsive to detecting the second action of the user, the mobile computing device may activate a microphone of the mobile computing device based on the first and second signals. By activating the microphone, the techniques of this disclosure may reduce an amount of time the user is waiting between the time mobile computing device detects the first action of the user and the time the microphone is active and ready to collect an audio sample of the user's voice for use in a voice-recognition authentication mechanism.

Figure 1:
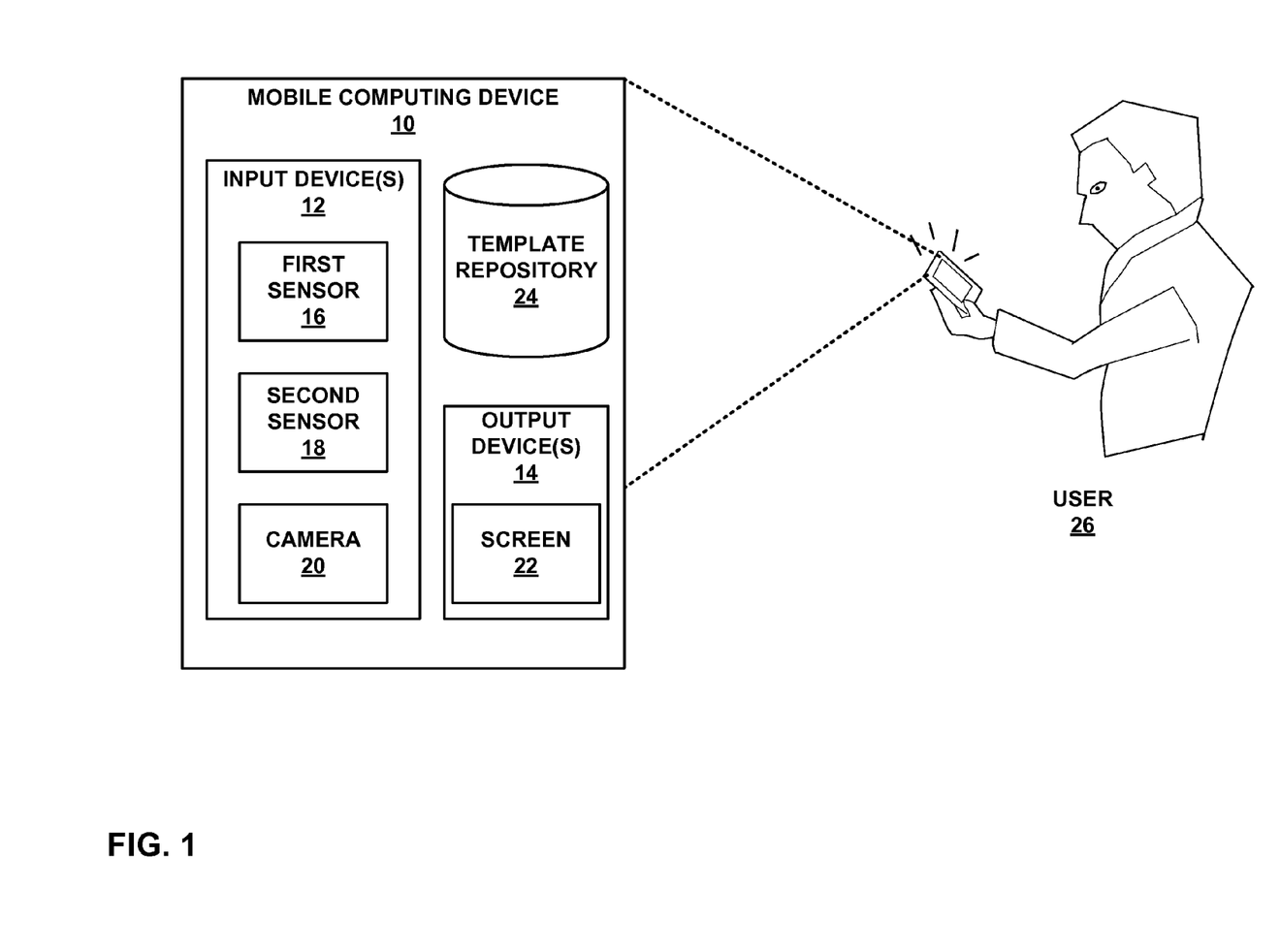
FIG. 1 is a conceptual diagram that illustrates an example computing device that may activate an input device based at least in part on signals from at least two sensors, in accordance with one or more aspects of the present disclosure.

FIG. 1 is a conceptual diagram that illustrates an example computing device that may activate an input device (e.g., a camera) based at least in part on one or more sensors, in accordance with one or more aspects of the present disclosure. In the example of FIG. 1, a user 26 holds a mobile computing device 10 that may perform facial, fingerprint, retina scan, or video gesture recognition authentication based on one or more images captured by mobile computing device 10. Mobile computing device 10 can include, be, or be part of one or more of a variety of types of devices, such as a mobile phone (including so-called "smartphones"), tablet computer, netbook, laptop, desktop, personal digital assistant ("PDA"), automobile, set-top box, television, and/or watch, among others.

In the example of FIG. 1, mobile computing device 10 can include input devices 12, at least one of which can include a camera 20. In some examples, camera 20 may be part of or coupled to a front-facing camera of mobile computing device 10. In other examples, camera 20 may be part of or coupled to a rear-facing camera of mobile computing device 10. One or both of the front-facing and rear-facing cameras may be capable of capturing still images, video images, or both.

Input devices 12 also include at least two sensors. In the example illustrated in FIG. 1, input devices 12 include a first sensor 18 and a second sensor 20. In other examples, input devices 12 can include more sensors than first sensor 18 and second sensor 20. For example, input devices 12 can include a third sensor (not shown in FIG. 1). In general, input devices mobile computing device 10 can include at least two sensors.

First sensor 16 and second sensor 18 may be different sensors. For example, first sensor 16 can include an accelerometer, a gyroscope, a proximity sensor, a light sensor, a temperature sensor, a pressure (or grip) sensor, a physical switch, or a button. In some examples, first sensor 16 may include a presence-sensitive screen, such as a capacitive or resistive touch screen of mobile computing device 10. Second sensor 18 also can include an accelerometer, a gyroscope, a proximity sensor, a light sensor, a temperature sensor, a pressure (or grip) sensor, a physical switch, or a button. Second sensor 18 may be different than first sensor 16. In some examples, second sensor 18 may include a presence sensitive screen, such as a capacitive or resistive touch screen of mobile computing device 10.

Although the description primarily describes first sensor 16 as a single sensor and second sensor 18 as a single, different sensor, in other examples, first sensor 16 may include a first group of sensors and second sensor 18 may include a second group of sensors. The first group of sensors may be different than the second group of sensors, e.g., no sensor in the first group of sensors may be included in the second group of sensors.

Mobile computing device 10 may further include output devices 14. At least one of output devices 14 may be a presence-sensitive screen 22. Screen 22 may output for display a graphical user interface (GUI). In various examples, mobile computing device 10 may cause screen 22 to update the GUI to include different user interface controls, text, images, or other graphical contents. Outputting or updating the GUI may generally refer to the process of causing screen 22 to change the contents of GUI 22, which screen 22 may output for display to user 26.

Mobile computing device 10 may further include a template repository 24. In some examples, template repository 24 may comprise a logical and/or physical location (e.g., a logical location that references a particular physical location), such as one or more of storage devices 34 of FIG. 2. In some examples, template repository 24 may comprise a directory or file of a file system, a database, or a sector or block of a hard disk drive, solid state drive, or flash memory. In an example, template repository 24 may also reside at least partially in a memory of storage devices 34 (e.g., if the images of template repository 24 are cached for later write through to one or more of storage devices 34).

The following example generally describes using a camera and a facial recognition authentication mechanism to unlock mobile computing device 10. However the techniques of this disclosure may generally apply to fingerprint, retina scan, video gesture, or voice recognition authentication as well as other authentication mechanisms using an input device 12 to unlock a mobile computing device 10. In general and in the example of FIG. 1, facial recognition may occur in two phases: an enrollment phase and an authentication phase. During the enrollment phase, user 26 uses camera 20 to capture one or more images (e.g., data samples) that form the basis of one or more templates. A template may comprise an image, features of an image, or a template derived from an image. Mobile computing device 10 may store the one or more of the captured templates or features derived from the captured templates in template repository 24 for later use in the authentication phase. The stored templates may be referred to as reference templates. More specifically, mobile computing device 10 may compare the reference templates stored in template repository 24 with a captured template of a user who is trying to authenticate (referred to as an "authentication user") with mobile computing device 10. The process of obtaining and storing one or more template images as a reference template is referred to as "enrollment."

The authentication phase of facial recognition on a mobile device occurs when user 26 attempts to authenticate himself or herself with mobile computing device 10 in order to gain access to resources of mobile computing device 10. During the authentication phase, mobile computing device 10 may capture a template (e.g., data sample) of user 26 with camera 20. The captured template may be one of an image or features of the image. Mobile computing device 10 then may compare the captured template with one or more of the reference templates stored in template repository 24.

More specifically, mobile computing device 10 may compare features of the captured template against the reference template features. Mobile computing device 10 may perform the comparison using one or more well-known recognition algorithms, such as geometric and/or photometric approaches, three-dimensional (3D) modeling and recognition techniques, principal component analysis using Eigen faces, linear discriminate analysis, elastic bunch graph matching, pattern matching, and dynamic link matching, to name just a few. Based on comparison-based values, such as preprogrammed acceptable margins of error, mobile computing device 10 may determine whether or not the captured template and one or more reference template are sufficiently similar to one another for facial recognition.

If mobile computing device 10 determines that the captured template matches one or more of the reference templates, mobile computing device 10 may grant user 26 access to the resources of mobile computing device 10 (e.g., may unlock mobile computing device 10). In some examples, if mobile computing device 10 determines that the features of the captured template do not match a sufficient number of the one or more templates stored in template repository 24, mobile computing device 10 may deny user 26 access to the resources of mobile computing device 10 (e.g., may not unlock mobile computing device 10).

More generally, mobile computing device 10 may perform the above operations regardless of the type of authentication mechanism mobile computing device 10 uses to unlock itself (e.g., facial, fingerprint, video gesture, retina scan, or voice recognition). For example, mobile computing device 10 may receive a first data sample collected by the input device 12. The first data sample may represent a face of user 26, a fingerprint of user 26, a video gesture of user 26, an eyeball retina scan of user 26, or a voice of user 26. Mobile computing device 10 may determine a captured template based on the first data sample. The captured template may include the first data sample, features of the first data sample, or a first template derived from the first data sample. Mobile computing device 10 may compare the captured template to a reference template. The reference template may include a second data sample, features of the second data sample, or a second template derived from the second data sample. Mobile computing device 10 may unlock itself if the captured template matches the reference template.

In accordance with one or more aspects of the disclosure, mobile computing device 10 may activate input device 12 (e.g., camera 20) based on signals from first sensor 16 and second sensor 18. For example, mobile computing device 10 may be in a locked state. In some examples, a locked state may be a state in which user 26 does not have access to resources of mobile computing device 10. For example, in a locked state, mobile computing device 10 may restrict user 26 from instructing device 10 to execute applications.

In some examples, when mobile computing device 10 is in a locked state, mobile computing device 10 may be in a lower power state than when mobile computing device 10 is in an unlocked state. For example, screen 22 may generally be disabled when in a locked state. Similarly, camera 20 may generally be disabled when device 10 is in a locked state, as may second sensor 18.

In one example, a mobile computing device may rely on a remote computing device (e.g., a server) to process the first and second signals and send a command to the mobile computing device to activate input device 12. For example, mobile computing device 10 may send the first and second signals received by the first and second sensor devices to a remote computing device. In response, the remote computing device may transmit a command to activate input device 12 to the mobile computing device based on the first and second signals. Responsive receiving the command from the remote computing device, mobile computing device 10 may activate input device 12.

When mobile computing device 10 is in the locked state, first sensor 16 may be active, e.g., may be actively sensing. As described above, first sensor 16 can include, for example, a gyroscope, an accelerometer, a light sensor, a proximity sensor, a temperature sensor, a pressure sensor, a physical switch, or a button. When first sensor 16 includes a gyroscope, first sensor 16 may sense rotational motion of mobile computing device 10. When first sensor 16 includes an accelerometer, first sensor 16 may sense acceleration of mobile computing device 10, sometimes in multiple axes (e.g., three orthogonal axes). When first sensor 16 includes a light sensor, first sensor 16 may sense an ambient light intensity proximate to mobile computing device 10. When first sensor 16 includes a proximity sensor, first sensor 16 may sense proximity of mobile computing device 10 to an external object. When first sensor 16 is a temperature sensor, first sensor 16 may detect a temperature of mobile computing device 10 or an object adjacent to first sensor 16 (e.g., external to mobile computing device 10). When first sensor 16 is a pressure sensor, first sensor 16 may sense a pressure exerted on a portion of mobile computing device 10, e.g., by an external object. In any case, first sensor 16 may generate a first signal representative of the sensed parameter. The signal generated by each of these sensors may be used by mobile computing device 10 to determine whether user 26 is permitted to unlock mobile computing device 10, as described in further detail below.

When mobile computing device 10 determines that the first signal represents an action of user 26, mobile computing device 10 may activate second sensor 18. In some examples, as described above, prior to activation, second sensor 18 may be in a deactivated state, e.g., may not be actively sensing. In some examples, prior to activation, mobile computing device 10 may not be providing power to second sensor 18 to save power usage and prolong battery life.

Second sensor 18 can include, for example, a gyroscope, an accelerometer, a light sensor, a proximity sensor, a temperature sensor, a pressure sensor, a physical switch, or a button. Second sensor 18 may be different than first sensor 16. Second sensor 18 also may sense a parameter that indicates an action by user 26 and generate a second signal representing the action. Mobile computing device 10 may receive the second signal and determine whether the signal represents a second action of user 26.

In some examples, the action sensed by second sensor 18 may be the same as the action sensed by first sensor 16, e.g., moving mobile computing device 10 from a first position to a second position. For example, both first sensor 16 and second sensor 18 may sense parameters indicating that user 26 is removing mobile computing device from a pocket or bag and is lifting mobile computing device in front of a face of user 26. In other examples, the action sensed by second sensor 18 may be different than the action sensed by first sensor 16. For example, first sensor 16 may include a pressure sensor and may sense a parameter indicating that user 26 is gripping mobile computing device 10, and second sensor 18 may include an accelerometer and may sense a parameter indicating that user 26 is lifting mobile computing device 10.

When mobile computing device 10 determines that both the first signal and the second signal represent actions of user 26, mobile computing device 10 may activate camera 20. Prior to activation, camera 20 may be in a deactivated state, e.g., may not be actively be collecting image or video data (e.g., still images or video images). In some examples, prior to activation, mobile computing device 10 may not be providing power to camera 20 to save power usage and prolong battery life.

When mobile computing device 10 activates camera 20, mobile computing device 10 may provide power to camera 20 and may execute firmware and/or software (e.g., an application) used to operate camera 20. In some examples, mobile computing device 10 may not cause camera 20 to actively capture images or video at this time. Instead, mobile computing device 10 may activate camera 20 and wait for a signal that indicates an input from user 26 using one of input devices 12, e.g., using a lock/unlock button, a power button, or a button that causes screen 22 to turn on and/or off before causing camera 20 to actively capture image or video data. In some examples, waiting for a signal that indicates input from user 26 may increase privacy for user 26 and decrease a chance of image or video collection when user 26 does not want images or video collected. In some of these examples, mobile computing device 10 also does not activate screen 22 until receiving the signal that indicates input from user 26.

In other examples, mobile computing device 10 may cause camera 20 to actively collect images or video immediately upon activating camera 20. Additionally, in some instances, mobile computing device 10 may activate screen 22 upon activating camera 20. In these examples, mobile computing device 10 may not wait for a signal that indicates input from user 26 via input devices 12. In some examples, activating screen 22 and causing camera 20 to actively collect images or video upon activating camera 20 may reduce a delay between the first signal representing the first action of user 26 and the time camera 20 is ready to collect images for facial recognition authentication mechanism.

Once camera 20 is activated and mobile computing device 10 is oriented relative to user 26 such that camera collects images of the face of user 26, mobile computing device 10 may collect a template of the face of user 26 and compare the collected template to one or more reference templates stored in template repository 24. In this way, activating camera 20 based at least in part on signals from first sensor 16 and second sensor 18 may decrease a delay between a first action by user 26 and the time at which the facial recognition authentication mechanism makes a determination to unlock device 10 or not unlock device 10.

Figure 2:
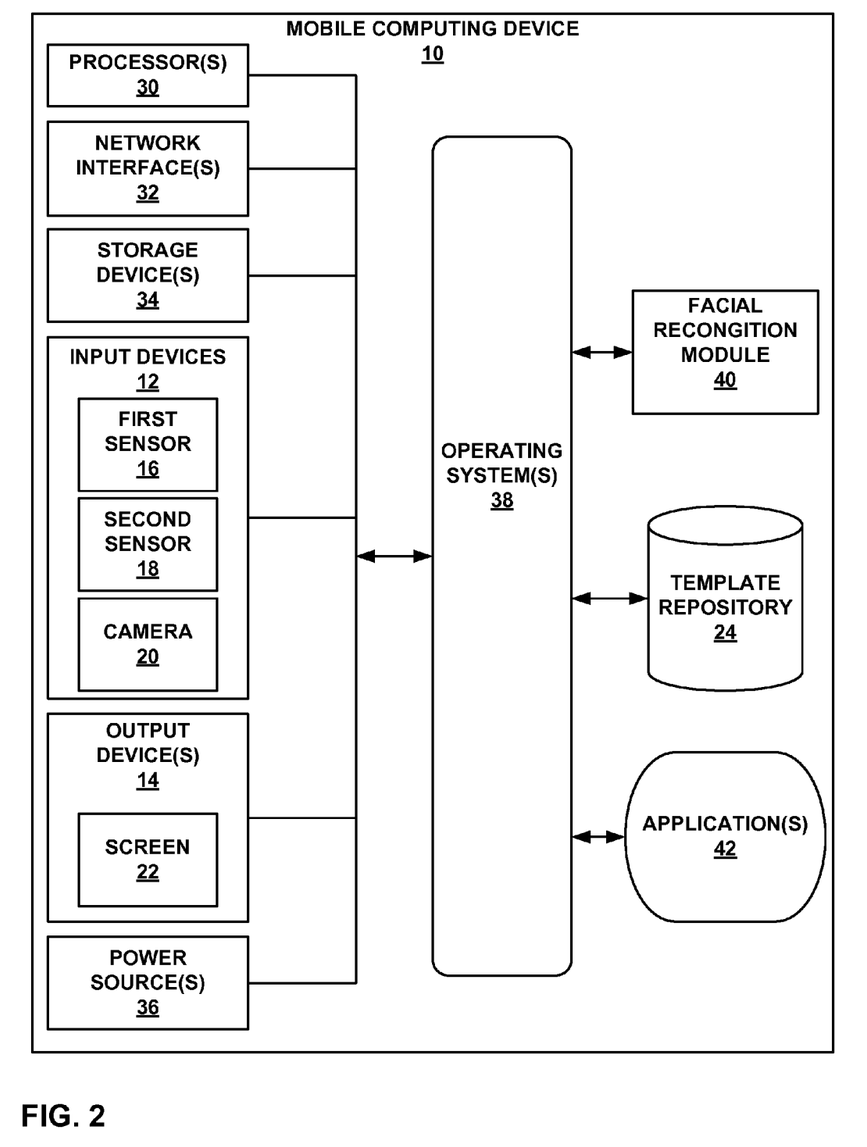
FIG. 2 is a block diagram illustrating further details of an example mobile computing device, in accordance with one or more aspects of the present disclosure.

FIG. 2 is a block diagram that illustrates further details of an example mobile computing device 10, in accordance with one or more aspects of the present disclosure. FIG. 2 illustrates only one particular example of mobile computing device 10, and many other example embodiments of mobile computing device 10 may be used in other instances.

As shown in the specific example of FIG. 2, mobile computing device 10 includes one or more processors 30, one or more network interfaces 32, one or more storage devices 34, input devices 12, one or more output devices 14, a template repository 24, and one or more power sources 36. Mobile computing device 10 also includes one or more operating systems 38 that are executable by mobile computing device 10.

Mobile computing device 10 may further include one or more applications 42, which the one or more processors 30 may execute. In some examples, user 26 (FIG. 1) may download and install the one or more applications 42.

Each of components 12, 14, 24, 30, 32, 34, 36, 38, 40, and 42 may be interconnected (physically, communicatively, and/or operatively) for inter-component communications. One or more processors 30, in one example, may be configured to implement functionality and/or process instructions for execution within mobile computing device 10. For example, one or more processors 30 may be capable of processing instructions stored on one or more storage devices 34. The one or more processors 30 can include, for example, one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

One or more storage devices 34 may be configured to store information within mobile computing device 10 during operation. For instance, one or more storage devices 34 can include a memory. One or more storage devices 34, in some examples, are described as a computer-readable storage medium. In some examples, at least one of the one or more storage devices 34 may be a temporary memory, meaning that a primary purpose of the at least one of the one or more storage devices 34 is not long-term storage. At least one of the one or more storage devices 34 may also, in some examples, be described as a volatile memory, meaning that the at least one of the one or more storage devices 34 does not maintain stored contents when the at least one of the one or more storage devices 34 is not receiving power. Examples of volatile memories include random access memories (RAM), dynamic random access memories (DRAM), static random access memories (SRAM), and other forms of volatile memories known in the art.

In some examples, at least one of the one or more storage devices 34 may be a long-term storage device. At least one of the one or more storage devices 34 may also, in some examples, be described as a nonvolatile memory, meaning that the at least one of the one or more storage devices 34 maintains stored contents when the at least one of the one or more storage devices 34 is not receiving power. Examples of nonvolatile memories include read only memory (ROM), such as programmable read-only memory (PROM), or erasable PROM (EPROM), electrically erasable PROM (EEPROM); flash memory; magnetoresistive random access memory (MRAM); ferroelectric random access memory (FeRAM); a hard disk; a compact disc ROM (CD-ROM); a floppy disk; a cassette; other magnetic media; other optical media; or the like.

In some examples, at least one of the one or more storage devices 34 may be used to store program instructions for execution by the one or more processors 30. At least one of the one or more storage devices 34 may be used by software or applications 42 executed by one or more processors 30 (e.g., one or more of applications 42) to temporarily store information during execution of the software or applications 42.

Additionally, at least one of the one or more storage devices 34 may store templates or threshold values for use by the one or more processors 30 when determining whether an action sensed by first sensor 16 and/or second sensor 18 of user 26.

Mobile computing device 10, in some examples, also includes one or more network interfaces 32. Mobile computing device 10, in one example, utilizes one or more network interfaces 32 to communicate with external devices via one or more networks, such as one or more wireless networks. Network interface 32 may be a network interface card, such as an Ethernet card, an optical transceiver, a radio frequency transceiver, or any other type of device that can send and receive information. Other examples of such network interfaces 32 can include Bluetooth, 3G, and WiFi radios in mobile computing device 10, as well as USB. In some examples, mobile computing device 10 utilizes network interface 32 to wirelessly communicate with an external device such as a server, a mobile phone, or another networked computing device.

Mobile computing device 10 also includes input devices 12. As described above, input devices 12 may include first sensor 16, second sensor 18, and camera 20. As described above, first sensor 16 and second sensor 18, respectively, may be one of a proximity sensor, a light sensor, a temperature sensor, a pressure sensor, an accelerometer, or a gyroscope. First sensor 16 and second sensor 18 may be different, e.g., first sensor 16 may be a proximity sensor and second sensor 18 may be an accelerometer. Although not shown in FIG. 2, in some examples, mobile computing device 10 can include more than two sensors, e.g., can include three sensors. In some examples, mobile computing device 10 includes at least two sensors. Additionally or alternatively, as described above, in some examples, first sensor 16 may include a first group of sensors and second sensor 18 may include a second, different group of sensors.

Camera 20 may be a front-facing or rear-facing camera. Responsive to first and second sensors 16 and 18, input from user 26, or input from applications 42, camera 20 may capture digital images, which may be stored on one or more storage devices 34. In some examples, camera 20 may be used to capture images, such as a captured template, as part of performing facial recognition authentication. Input devices 12, in some instances, can include other devices configured to receive input from a user (e.g., user 26 in FIG. 1) through tactile, audio, or video input. Other examples of input device 12 include a mouse, a keyboard, a voice responsive system, video camera, microphone, or any other type of device for detecting an input from a user.

One or more output devices 14 may also be included in mobile computing device 10. The one or more output devices 14, in some examples, may be configured to provide output to a user (FIG. 1) using tactile, audio, and/or visual output. For example, one of the one or more output devices 14 can include screen 22. Screen 22 can include, for example, a liquid crystal display (LCD), plasma screen, cathode ray tube (CRT), an organic light-emitting diode (OLED) screen, or the like. Other examples of one or more output devices 14 include a speaker, a motor, or the like. Output devices 14 may utilize a sound card, a video graphics adapter card, and/or any other type of device for converting a signal into an appropriate form understandable to humans or machines.

In some examples, at least one of input devices 12 may also be an output device 14. For example, an input device 12 that is also an output device 14 includes a presence-sensitive screen. A presence-sensitive screen is a screen, such as a LCD, plasma screen, CRT, OLED, or other display, which may detect when a user, such as user 26, is present at a computing device, such as mobile computing device 10. The presence-sensitive screen can include one or more cameras or other sensing devices for detecting the presence of the user. The presence sensitive screen may also detect one or more movements of the user, such as a gesture or other motion made by the user. In response to the presence of a user or an action or gesture made by the user, the computing device may take one or more actions.

Mobile computing device 10, in some examples, can include one or more power sources 36, which may be rechargeable and provide power to mobile computing device 10. One or more power sources 36 may be internal to mobile computing device 10, such as a battery, or may be an external power source. In some examples where one or more power sources 36 are one or more batteries, the one or more batteries may be made from nickel-cadmium, lithium-ion, or other suitable material.

Mobile computing device 10 can include one or more operating systems 38. The one or more operating systems 38, in some examples, may control the operation of components of mobile computing device 10. For example, the one or more operating systems 38, in one example, facilitates the interaction of facial recognition module 40 with one or more processors 30, one or more network interfaces 32, one or more storage devices 34, input devices 12, output devices 14, and one or more power sources 36. If mobile computing device 10 includes more than one operating system 38, mobile computing device 10 may run one of operating systems 38 and switch between others of operating systems 38, and/or may virtualize one or more of operating systems 38.

In some examples, facial recognition module 40, along with template repository 24, may be a part of one or more operating systems 38. In other examples, facial recognition module 40, along with template repository, may comprise one or more of applications 42. In some examples, facial recognition module 40 may receive user input from one or more of input devices 12, e.g., camera 20. Facial recognition module 40 may, for example, receive a captured template as part of performing facial recognition authentication. Facial recognition module 40 can include instructions that cause the one or more processors 30 to analyze the captured template, e.g., compare the captured template to one or more reference templates stored in template repository 24.

In the event that user 26 attempts to authenticate with mobile computing device 10 via facial recognition, but is not authorized, facial recognition module 40 may deny user 26 access to the resources of mobile computing device 10, such as one or more storage devices 34, input devices 12, one or more network interfaces 32, one or more output devices 14, etc. Facial recognition module 40 may further discard the captured template. Facial recognition module 40 may also update the GUI displayed using screen 22 to indicate to user 26 a problem with the captured template, e.g., that user 26 is not authorized to user mobile computing device 10. On the other hand, when facial recognition module 40 determines that user 26 is authorized to use mobile computing device 10, facial recognition 40 allow user 26 access to the resources of mobile computing device 10, e.g., may unlock mobile computing device.

Figure 3:
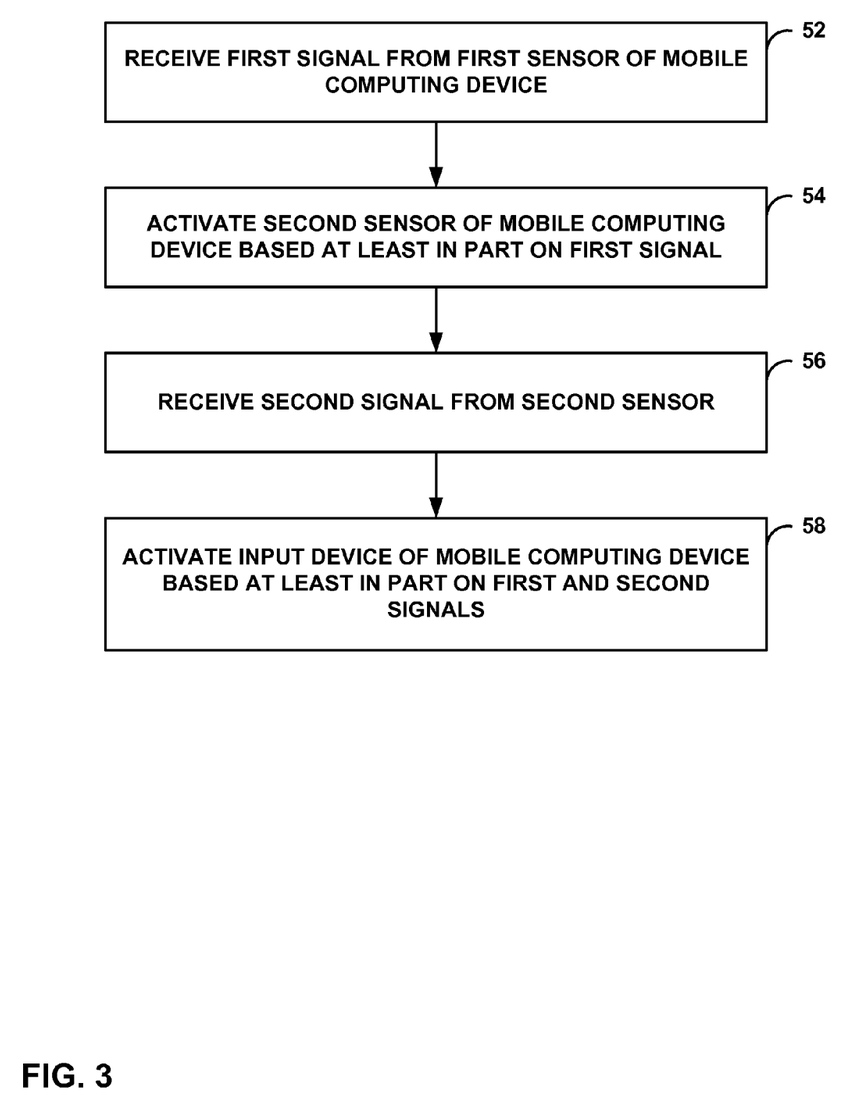
FIG. 3 is a flow diagram of an example technique that the mobile computing device may execute to activate an input device based at least in part on signals from a first sensor and a second sensor, in accordance with one or more aspects of the present disclosure.

FIG. 3 is a flow diagram of an example technique that a mobile computing device (e.g., mobile computing device 10) may execute to activate an input device (e.g., camera 20) based at least in part on signals from a first sensor (e.g., first sensor 16) and a second sensor (e.g., second sensor 18), in accordance with one or more aspects of the disclosure. For purposes of illustration only, FIG. 3 will be described with respect to mobile computing device 10 shown in FIG. 2. In other examples, the technique illustrated in FIG. 3 may be implemented by another mobile computing device, e.g., a mobile computing device having additional or fewer components and/or other functionality.

In some examples, mobile computing device 10 may be in a locked state when beginning the technique of FIG. 3 and during at least part of the technique of FIG. 3. When in a locked state, mobile computing device 10 may restrict user 26 from accessing at least some features and/or resources of mobile computing device 10, as described above. Additionally, in some examples, mobile computing device 10 may be in a low power state when in the locked state. For example, fewer than all input devices 12 may be activated (or enabled) in the low power state. In accordance with the technique of FIG. 3, second sensor 18 may be disabled (or deactivated) prior to receiving the first signal from first sensor 16 of mobile computing device 10 (52). In some examples, all sensors of mobile computing device 10 other than first sensor 16 may be prior to receiving the first signal from first sensor 16 of mobile computing device 10 (52). In other examples, second sensor 18 and some of any other sensors of mobile computing device 10 may be disabled, and first sensor 16 may be enabled, prior to receiving the first signal from first sensor 16 of mobile computing device 10 (52).

Regardless of the status of input devices 12 other than first sensor 16 and second sensor 18, the technique of FIG. 3 includes receiving, with one or more processors 30, a first signal from first sensor 16 of mobile computing device 10 (52). The first signal may represent a first action of user 26. As described above, first sensor 16 can include a gyroscope, an accelerometer, a light sensor, a proximity sensor, a temperature sensor, or a pressure (or grip) sensor. In some examples, first sensor 16 is not a presence-sensitive screen. First sensor 16 may be configured to sense one or more parameters, such as, for example, orientation of mobile computing device 10, motion of mobile computing device 10, ambient light proximate to mobile computing device 10, proximity of an object to mobile computing device 10, temperature of a portion of mobile computing device 10 or an area proximate to mobile computing device 10, or pressure exerted on a portion of mobile computing device 10.

Regardless of what parameter first sensor 16 is configured to sense, the parameter may represent a first action of user 26. For example, a gyroscope may sense an orientation or a series of orientations of mobile computing device 10 and generate a first signal representing the orientation or series of orientations. The one or more processors 30 may compare the orientation or series of orientations to a template orientation or template series of orientations stored by one or more storage devices 34 to determine whether the orientation or series of orientations represents a first action of user 26. For example, the first action may be user 26 holding mobile computing device 10 substantially still in a substantially vertical orientation.

Similarly, when first sensor 16 includes an accelerometer, first sensor 16 may sense a series of movements of mobile computing device 10 and generate a first signal representing the series of movements. The one or more processors 30 may compare the pattern of movement to a template series of movements stored by one or more storage devices 34 to determine whether the series of movements of mobile computing device 10 represents a first action of user 26. For example, the first action may be user 26 raising mobile computing device 10 in front of his or her face then holding mobile computing device 10 substantially motionless.

As another example, when first sensor 16 includes a light sensor, sensor 16 may generate a first signal representing a light intensity sensed by first sensor 16. The one or more processors 30 may compare the first signal to a threshold light intensity value. In some examples, the threshold light intensity value may be selected so that a value of the signal below the threshold value indicates that mobile computing device 10 is located in a location without a significant light source, such as a pocket or a bag, and a value of the signal above the threshold value indicates that mobile computing device 10 is exposed to a light source. The one or more processors 30 may determine that user 26 moved mobile computing device 10 from a location without a significant light source to a location exposed to a light source when the value of the first signal changes from below the threshold light intensity value to above the threshold light intensity value. The one or more processors 30 may determine that this movement of mobile computing device 10 is a first action of user 26. For example, the first action may be user 26 removing mobile computing device 10 from a bag or a pocket or lifting mobile computing device 10 from a surface on mobile computing device 10 is resting (and which blocks light from impinging on first sensor 16).

As an additional example, when first sensor 16 includes a proximity sensor, first sensor 16 may generate a first signal representing proximity of mobile computing device 10 to another object. For example, the object may be a surface against which mobile computing device 10 is resting, such as table, bag, pocket, or the like. As another example, the object may be a portion of user 26, such as a hand or face.

In some examples, the one or more processors 30 may compare the first signal to a threshold proximity value. The threshold proximity value may be selected so that a value on one side of the threshold proximity value (e.g., greater than or less than the threshold proximity value) indicates that an object is proximate to first sensor 16 and a value on the other side of the threshold proximity value (e.g., less than or greater than the threshold proximity value) indicates that an object is not proximate to first sensor 16. In some examples, the one or more processors 30 may determine that the first signal represents a first action of user 26 when the value of the first signal changes from a first side of the threshold proximity value to a second side of the threshold proximity value. For instance, the one or more processors 30 may determine that the first signal represents a first action of user 26 when the value of the first signal changes from representing that first sensor 16 is proximate to an object to representing that first sensor 16 is not proximate to an object. In this case, the first action may be user 26 removing mobile computing device 10 from a bag or a pocket or lifting mobile computing device 10 from a surface on which mobile computing device 10 is resting.

In other examples, first sensor 16 can include a temperature sensor, and first sensor 16 may generate a first signal representing a temperature of a portion of mobile computing device 10 or another object adjacent to mobile computing device 10. The one or more processors 30 may compare the first signal to a threshold temperature value. For example, the threshold temperature value may be selected so that when a value of the first signal is above the threshold temperature value, the one or more processors 30 determine that the mobile computing device 10 is located in an enclosed space, such as a bag (e.g., a purse) or a pocket. Conversely, the one or more processors 30 may determine that the mobile computing device 10 is not in an enclosed space, such as a bag or a pocket, when the value of the first signal is below the threshold temperature value. In some examples, the one or more processors 30 may determine that the first signal represents a first action of user 26 when the value of the first signal changes from above the threshold temperature value to above the threshold temperature value. In this case, the first action may be user 26 removing mobile computing device 10 from a bag or a pocket.

In other examples, first sensor 16 can include a pressure sensor, and first sensor 16 may generate a first signal representing a pressure applied to first sensor 16. The one or more processors 30 may compare the first signal to a threshold pressure value. For example, the threshold pressure value may be selected so that when a value of the first signal is above the threshold pressure value, the one or more processors 30 determine that the mobile computing device 10 is being held or gripped by user 26. Conversely, the one or more processors 30 may determine that the mobile computing device 10 is not being held or gripped by user 26 when the value of the first signal is below the threshold pressure value. In some examples, the one or more processors 30 may determine that the first signal represents a first action of user 26 when the value of the first signal changes from below the threshold pressure value to above the threshold pressure value. In this case, the first action may be user 26 picking up or gripping mobile computing device 10.

Regardless of the nature of first sensor 16 and the manner in which one or more processors 30 determines that the first signal represents a first action of user 26, when one or more processors 30 receives the first signal, the one or more processors 30 activates a second sensor 18 of mobile computing device 10 based at least in part on the first signal (54). As described above, prior to being activated (54), second sensor 18 may be inactive. For example, second sensor 18 may not be actively sensing parameters, and may be in a low power state or a state in which second sensor 18 is not receiving power from one or more power sources 36. Activating second sensor 18 (54) can include supplying power to second sensor 18 and/or causing second sensor 18 to actively sense the parameter which second sensor 18 is configured to sense.

Second sensor 18 can include any of the sensors described above with respect to first sensor 16, and second sensor 18 is different than first sensor 16. Second sensor generates a second signal that represents a second action of user 26. One or more processors 30 receive the second signal from second sensor 18 (56). The one or more processors 30 may implement any of the techniques described above with respect to determining whether the first signal represents a first action of user 26 to determine whether the second signal represents a second action of user 26.

In some examples, the action sensed by second sensor 18 may be the same as the action sensed by first sensor 16, e.g., moving mobile computing device 10 from a first position to a second position. For example, both first sensor 16 and second sensor 18 may sense parameters indicating that user 26 is removing mobile computing device from a pocket or bag and is lifting mobile computing device in front of a face of user 26. In other examples, the action sensed by second sensor 18 may be different than the action sensed by first sensor 16. For example, first sensor 16 may include a pressure sensor and may sense a parameter indicating that user 26 is gripping mobile computing device 10, and second sensor 18 may include an accelerometer and may sense a parameter indicating that user 26 is lifting mobile computing device 10.

The technique illustrated in FIG. 3 also includes activating input device 12 based at least in part on the first signal and the second signal (58). In some implementations, one or more processors 30 may activate camera 20 based at least in part on the first signal and the second signal (58). In some examples, one or more processors 30 must determine that both the first signal and the second signal indicate the intent of user 26 to unlock mobile computing device 10 before one or more processors 30 activates camera 20 (58). For example, when one or both of the first or second signals does not indicate the intent of user 26 to unlock mobile computing device 10, one or more processors 30 may not activate camera 20.

As described above, prior to being activated (58), camera 20 may be inactive. For example, camera 20 may not be actively collecting digital image or video data, and may be in a low power state or a state in which camera 20 is not receiving power from one or more power sources 36. Activating camera 20 (58) can include supplying power to camera 20 and/or causing camera 20 to actively collect digital image or video data. Camera 20 then may be ready to collect digital image or video data for use in a facial recognition authentication mechanism. In this way, activating camera 20 based at least in part on signals from first sensor 16 and second sensor 18 may decrease a delay between a first action by user 26 and the time at which the facial recognition authentication mechanism makes a determination to unlock device 10 or not unlock device 10.

Figure 4:
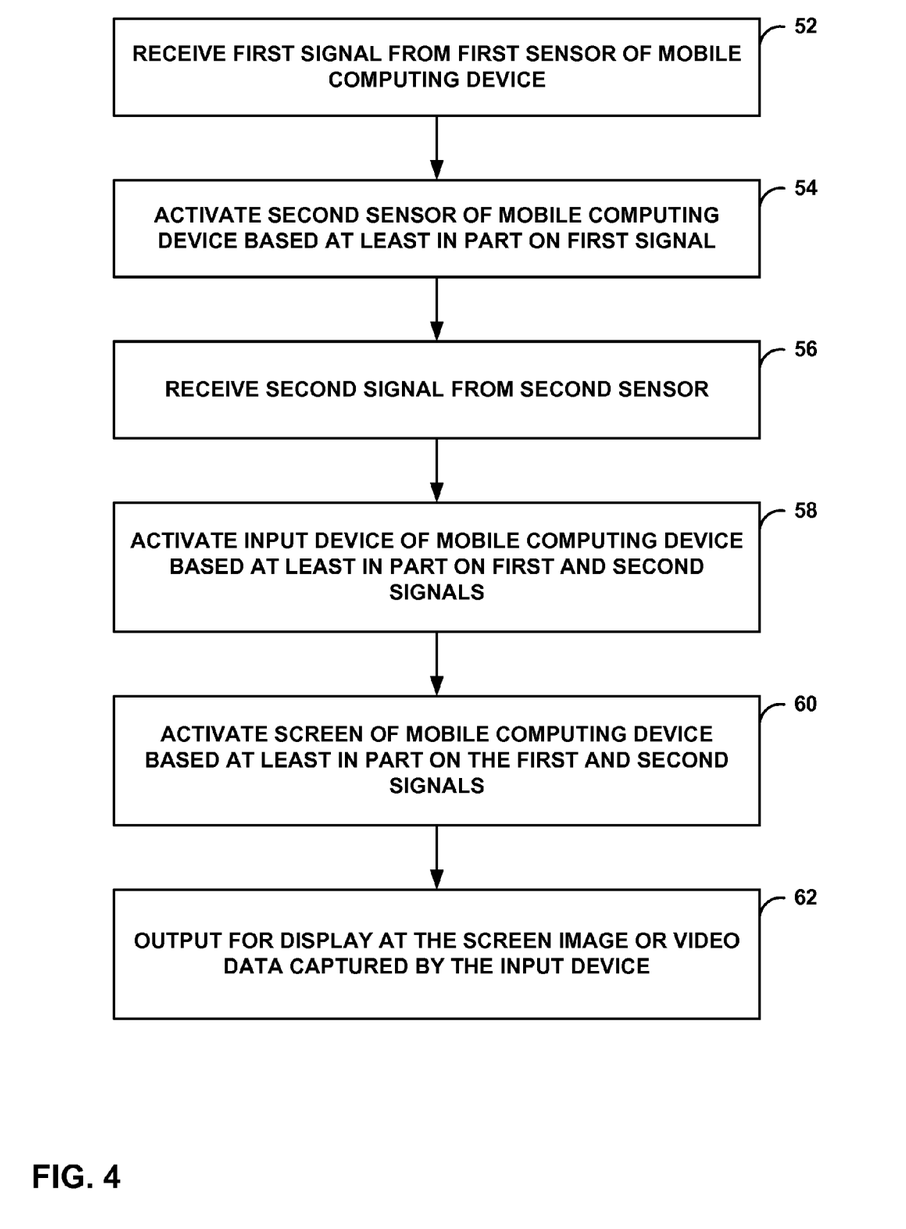
FIG. 4 is a flow diagram of another example technique that a mobile computing device may execute to activate an input device based at least in part on signals from a first sensor and a second sensor, in accordance with one or more aspects of the present disclosure.

FIG. 4 is a flow diagram of an example technique that a mobile computing device (e.g., mobile computing device 10) may execute to activate an input device (e.g., camera 20) based at least in part on signals from a first sensor (e.g., first sensor 16) and a second sensor (e.g., second sensor 18), in accordance with one or more aspects of the disclosure. For purposes of illustration only, FIG. 4 will be described with respect to mobile computing device 10 shown in FIG. 2. In other examples, the technique illustrated in FIG. 4 may be implemented by another mobile computing device, e.g., a mobile computing device having other components and/or other functionality.

The technique shown in FIG. 4 can include the technique shown in FIG. 3. For example, the technique illustrated in FIG. 4 includes the following: receiving, with one or more processors 30, a first signal from first sensor 16 of mobile computing device 10 (52); activating second sensor 18 of mobile computing device 10 based at least in part on the first signal (54); receiving, with one or more processors 30, a second signal from second sensor 18 of mobile computing device 10 (56); and activating camera 20 based at least in part on the first signal and the second signal (58).

The technique of FIG. 4 further includes activating screen 22 based at least in part on the first and second signals (60). In some examples, one or more processors 30 may activate screen 22 upon determining that the first signal and the second signal represent actions by user 26. In some instances, one or more processors 30 activate screen 22 after activating camera 20. In other instances, one or more processors 30 activate screen 22 before activating camera 20. In other instances, one or more processors 30 activate screen 22 at substantially the same time as activating camera 20.

Prior to being activated (60), screen 22 may be inactive. For example, screen 22 may not be actively outputting an image for display, and may be in a low power state or a state in which screen 22 is not receiving power from one or more power sources 36. Activating screen 22 (60) can include supplying power to screen 22 and/or causing screen 22 to output an image for display, such as a GUI. The technique also includes outputting for display at screen 22 a still image or video captured by input device 12 (e.g., camera 20) at screen 22 (62). In some examples, the still image or video captured by camera 20 may be used by one or more processors 30 in a facial recognition authentication mechanism, as described with respect to FIG. 6.

Figure 5:
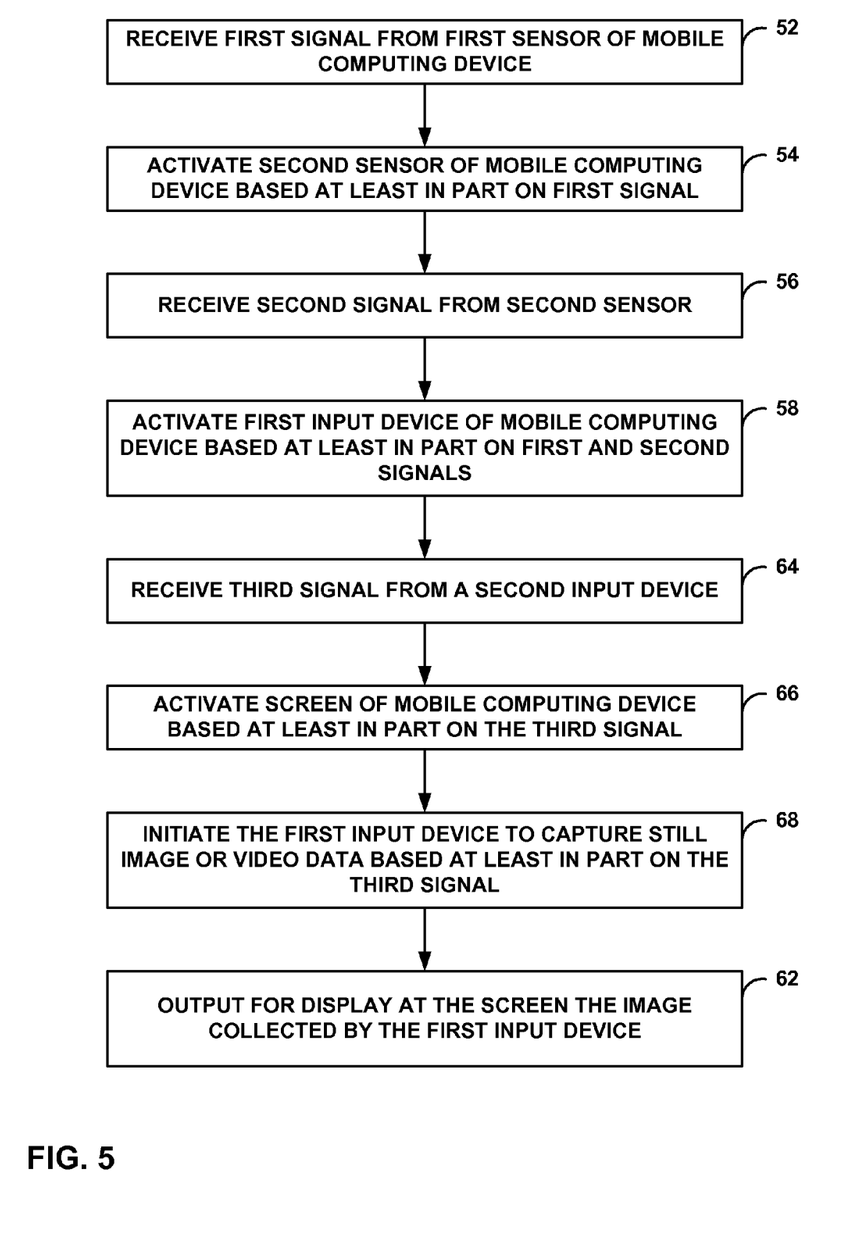
FIG. 5 is a flow diagram of an additional example technique that a mobile computing device may execute to activate an input device based at least in part on signals from a first sensor and a second sensor, in accordance with one or more aspects of the present disclosure.

FIG. 5 is a flow diagram of an additional example technique that a mobile computing device (e.g., mobile computing device 10) may execute to activate a first input device (e.g., camera 20) based at least in part on signals from a first sensor (e.g., first sensor 16) and a second sensor (e.g., second sensor 18), in accordance with one or more aspects of the present disclosure. For purposes of illustration only, FIG. 5 will be described with respect to mobile computing device 10 shown in FIG. 2. In other examples, the technique illustrated in FIG. 5 may be implemented by another mobile computing device, e.g., a mobile computing device having other components and/or other functionality.

The technique shown in FIG. 5 can include the technique shown in FIG. 3. For example, the technique illustrated in FIG. 5 includes the following: receiving, with one or more processors 30, a first signal from first sensor 16 of mobile computing device 10 (52); activating second sensor 18 of mobile computing device 10 based at least in part on the first signal (54); receiving, with one or more processors 30, a second signal from second sensor 18 of mobile computing device 10 (56); and activating first input device 12 (e.g., camera 20) based at least in part on the first signal and the second signal (58).

Activating first input device 12 (e.g., camera 20) may in some examples include providing power to camera 20 but not causing camera 20 to actively capture image or video data. Instead, camera 20 may be placed in a stand-by state in which camera 20 is ready to capture image or video data, but is not actively capturing image or video data.

The technique of FIG. 5 includes receiving, with one or more processors 30, a third signal from a second input device (e.g., one of input devices 12 different from the first input device) (64). The second input devices 12 can include, for example, a lock/unlock button, a power button, or a button that causes screen 22 to turn on and/or off. The third signal may represent a third action of user 26 (e.g., actuating the lock/unlock button, power button, or button that causes screen 22 to turn on and/or off) that indicates user 26 intends to unlock mobile computing device 10. Additionally, the third signal may represent an action of user 26 that indicates user 26 intends to activate screen 22.

The one or more processors 30 then activate screen 22 based at least in part on the third signal (66). Prior to being activated (66), screen 22 may be inactive. For example, screen 22 may not be actively outputting an image for display, and may be in a low power state or a state in which screen 22 is not receiving power from one or more power sources 36. Activating screen 22 (66) can include supplying power to screen 22 and/or causing screen 22 to display an image, such as a GUI.

The one or more processors 30 also initiates first input device 12 (e.g., camera 20) to capture still image or video data based at least in part on the third signal (68) and causes the still image or video data to be output for display at screen 22 (62). In some examples, the still image or video captured by camera 20 may be used by one or more processors 30 in a facial recognition authentication mechanism, as described with respect to FIG. 6. Waiting for the third signal to initiate camera 20 to capture still image or video data (68) and activate screen 22 (66) may increase privacy for user 26 and decrease a chance of image or video collection when user 26 does not want images or video collected.

Figure 6:
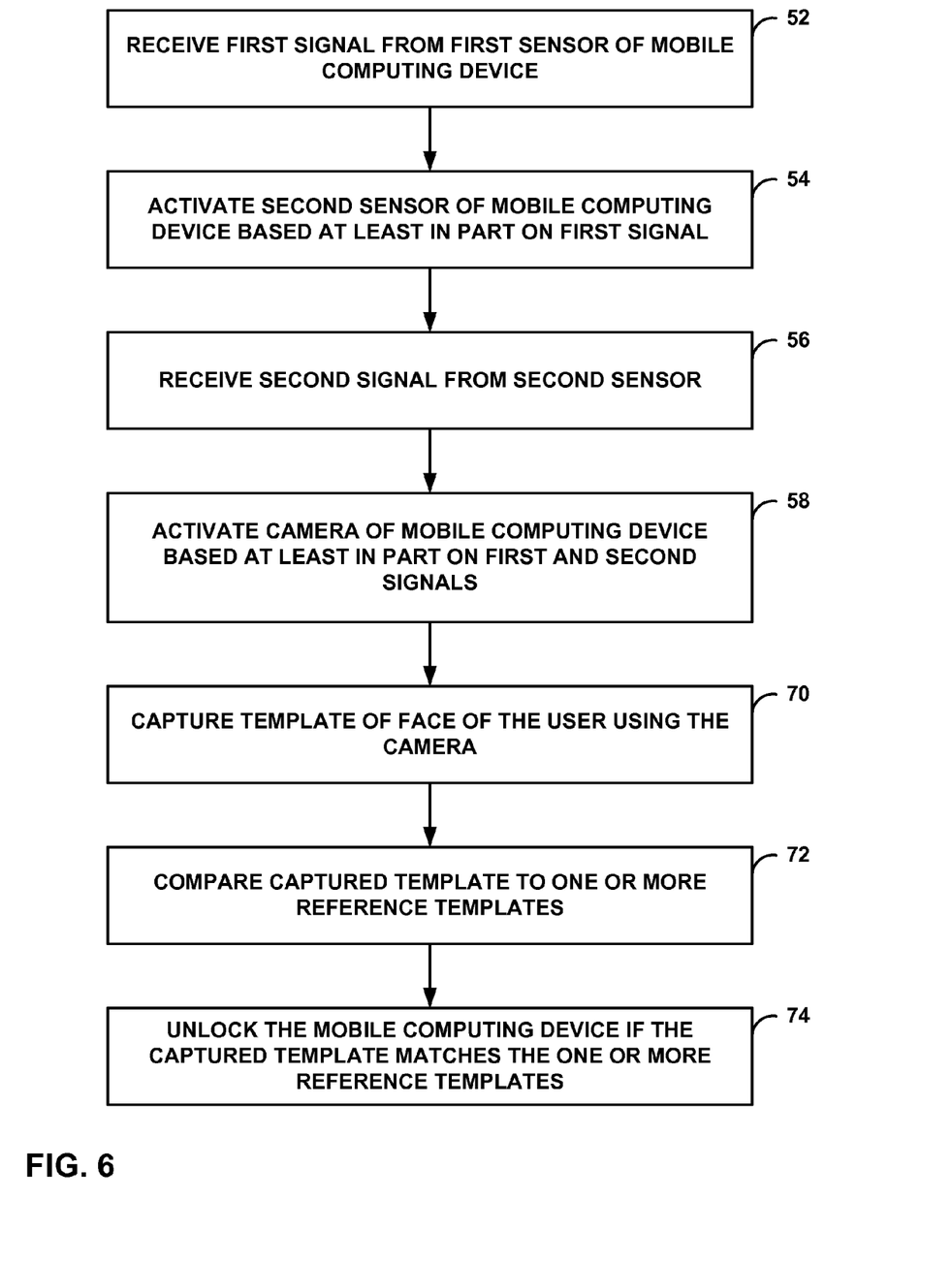
FIG. 6 is a flow diagram of an example technique that a mobile computing device may execute to activate an input device based at least in part on signals from a first sensor and a second sensor and utilize the input device in a facial recognition authentication mechanism, in accordance with one or more aspects of the present disclosure.

FIG. 6 is a flow diagram of an example technique that a mobile computing device (e.g., mobile computing device 10) may execute to activate an input device, (e.g., camera 20) based at least in part on signals from a first sensor (e.g., first sensor 16) and a second sensor (e.g., second sensor 18) and utilize the input device in a facial recognition authentication mechanism, in accordance with one or more aspects of the present disclosure. FIG. 6 will be described with respect to mobile computing device 10 shown in FIG. 2. In other examples, the technique illustrated in FIG. 6 may be implemented by another mobile computing device, e.g., a mobile computing device having other components and/or other functionality.

The technique shown in FIG. 6 can include the technique shown in FIG. 3. For example, the technique illustrated in FIG. 6 includes the following: receiving, with one or more processors 30, a first signal from first sensor 16 of mobile computing device 10 (52); activating second sensor 18 of mobile computing device 10 based at least in part on the first signal (54); receiving, with one or more processors 30, a second signal from second sensor 18 of mobile computing device 10 (56); and activating input device 12 (e.g., camera 20) based at least in part on the first signal and the second signal (58).

The technique also includes capturing a template of a face of user 26 using camera 20 (70). As described above, a template can include an image, features of an image, or a template derived from an image. In examples in which the template includes an image or features of an image, one or more processors 30 may derive the features or the template from an image captured using camera 20.

The one or more processors 30 then compares the one or more reference templates stored in template repository 24 with a captured template of user 26 (who is trying to authenticate with mobile computing device 10) (72). For example the one or more processors 30 can compare features of the captured template against the one or more reference templates. In some examples, the one or more processors 30 may compare features of the captured template against the reference template features. The one or more processors 30 may perform the comparison using one or more recognition algorithms, such as geometric and/or photometric approaches, three-dimensional (3D) modeling and recognition techniques, principal component analysis using Eigen faces, linear discriminate analysis, elastic bunch graph matching, pattern matching, and dynamic link matching, to name just a few.

Based on comparison-based values, such as preprogrammed acceptable margins of error, the one or more processors 30 may determine whether or not the captured template and one or more reference template are sufficiently similar to one another for facial recognition.

If the one or more processors 30 determines that the captured template matches one or more of the reference templates, the one or more processors 30 may grant user 26 access to the resources of mobile computing device 10 (e.g., may unlock mobile computing device 10) (74). In some examples, if the one or more processors 30 determines that the features of the captured template do not match a sufficient number of the one or more templates stored in template repository 24, the one or more processors 30 may deny user 26 access to the resources of mobile computing device 10 (e.g., may not unlock mobile computing device 10). By activating camera 20 based on the input of at least two sensors 16 and 18, the technique of FIG. 7 may reduce an amount of time user 26 is waiting between the time user 26 decides to unlock mobile computing device 10 and the time camera 20 is active and ready to collect an image of user 26 for use in the facial recognition authentication mechanism.

Figure 7:
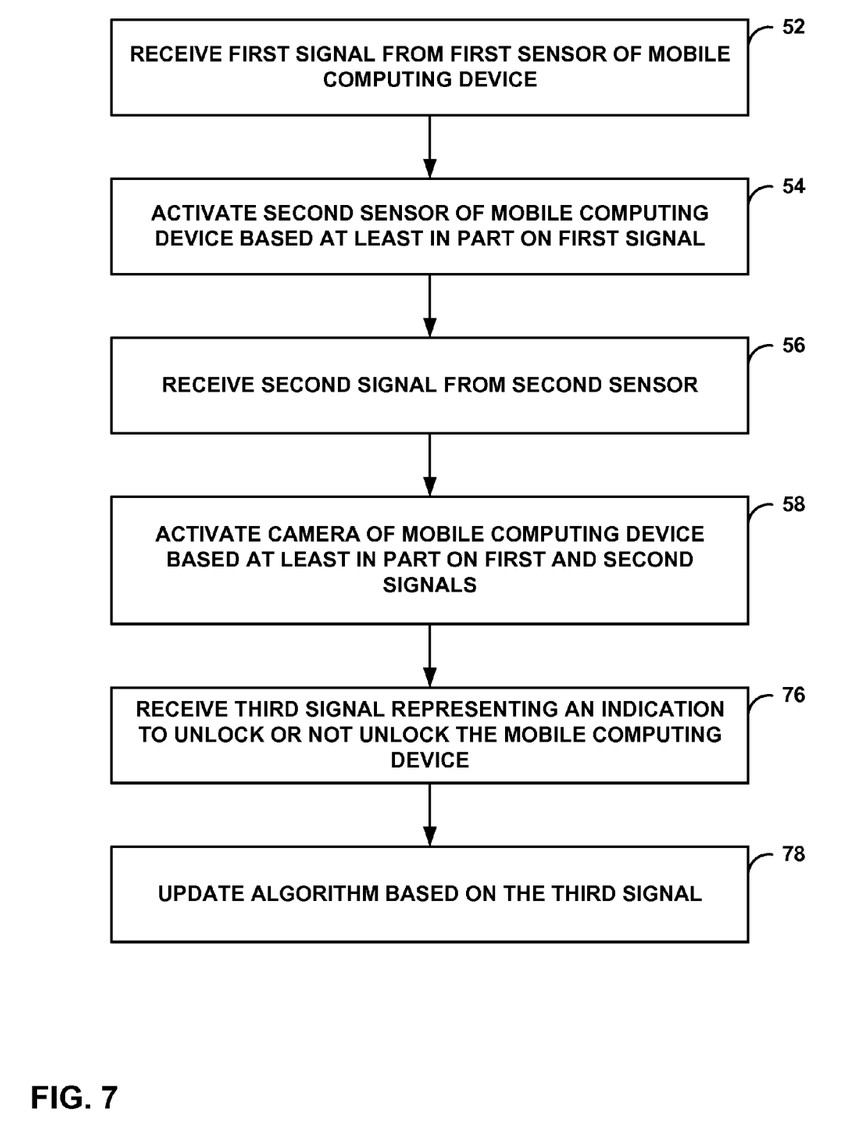
FIG. 7 is a flow diagram of an example technique that a mobile computing device may execute to improve a prediction, of whether to unlock or not to unlock the mobile computing device, based on signals from a first sensor and a second sensor, in accordance with one or more aspects of the present disclosure.

FIG. 7 is a flow diagram of an example technique that a mobile computing device may execute to improve a prediction, of whether to unlock or not to unlock the mobile computing device, based on signals from a first sensor and a second sensor, in accordance with one or more aspects of the present disclosure.

For purposes of illustration only, FIG. 7 will be described with respect to mobile computing device 10 shown in FIG. 2. In other examples, the technique illustrated in FIG. 7 may be implemented by another mobile computing device, e.g., a mobile computing device having other components and/or other functionality.

The technique shown in FIG. 7 can include the technique shown in FIG. 3. For example, the technique illustrated in FIG. 7 includes the following: receiving, with one or more processors 30, a first signal from first sensor 16 of mobile computing device 10 (52); activating second sensor 18 of mobile computing device 10 based at least in part on the first signal (54); receiving, with one or more processors 30, a second signal from second sensor 18 of mobile computing device 10 (56); and activating input device 12 (e.g., camera 20) based at least in part on the first signal and the second signal (58).

The technique of FIG. 7 also includes receiving a third signal representing an indication from user 26 to unlock or not unlock computing device 10 (76). For example, user 26 may notice that camera 20 and screen 22 were activated and images captured by camera 20 were displayed at screen 22. In some instances, if user 26 proceeds to unlock device 10, e.g., using facial recognition authentication, the one or more processors 30 may interpret the unlocking of device 10 to represent an indication from user 26 to unlock or not unlock computing device 10. The one or more processors 30 may correlate this to a successful prediction based on the first and second signals to unlock or not unlock computing device 10. The one or more processors 30 may then update an algorithm (e.g., a decision tree) used to determine whether to unlock or not unlock computing device 10 based on the first signal and second signal (78).

In other examples, the one or more processors 30 unlocks mobile computing device 10, e.g., based on facial recognition authentication, the one or more processors 30 may cause screen 22 to display a GUI that includes a query to user 26 to confirm a prediction by mobile computing device 10 to unlock mobile computing device 10. The GUI may include one or more user interface elements that allows user 26 to input a confirmation of whether to unlock mobile computing device 10 or to not unlock device 10. The one or more processors 30 may receive a signal representing the input from user 26, and may correlate the response of user 26 to the first and second signals used to unlock mobile computing device 10. The one or more processors 30 then may update an algorithm (e.g., a decision tree) used to determine whether to unlock mobile computing device 10 the first signal and second signal (78).

In other examples, computing device 10 may activate camera 20 and/or or screen 22. In some of these examples, user 26 may actuate a button, such as a lock/unlock button, a power button, or a button that causes screen 22 to turn on and/or off, and the one or more processors 30 may interpret a signal indicating this actuation as an indication to not unlock mobile computing device 10. The one or more processors 30 may receive the signal and correlate the negative response of user 26 to the first and second signals that the one or more processors 30 analyzed to determine whether to unlock mobile computing device 10. The one or more processors 30 then may update an algorithm (e.g., a decision tree) used to determine whether to unlock mobile computing device 10 based on the first signal and second signal (78).

Updating the algorithm based on false positives and/or true positives may, over time, reduce a number of false positives (e.g., time where the one or more processors 30 activates camera 20 when user 26 does not actually intend to unlock device 10). Reducing a number of false positives may reduce unnecessary or undesired activations of input device 12 (e.g., camera 20), and may in some examples reduce unnecessary power consumption of device 10.

Techniques described herein may be implemented, at least in part, in hardware, software, firmware, or any combination thereof. For example, various aspects of the described embodiments may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units are realized by separate hardware, firmware, or software components. Rather, functionality associated with one or more modules or units may be performed by separate hardware, firmware, or software components, or integrated within common or separate hardware, firmware, or software components.

Techniques described herein may also be embodied or encoded in an article of manufacture including a computer-readable storage medium encoded with instructions. Instructions embedded or encoded in an article of manufacture including an encoded computer-readable storage medium may cause one or more programmable processors, or other processors, to implement one or more of the techniques described herein, such as when instructions included or encoded in the computer-readable storage medium are executed by the one or more processors. Computer readable storage media can include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In general, a computer-readable storage medium may be any tangible medium that can contain or store a program for use by or in connection with an instruction execution system, apparatus, or device. Additional examples of computer readable medium include computer-readable storage devices, computer-readable memory, and tangible computer-readable medium. In some examples, an article of manufacture may comprise one or more computer-readable storage media.

In some examples, computer-readable storage media may comprise non-transitory media. The term "non-transitory" may indicate that the storage medium is tangible and is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
    receiving, by one or more processors, a first signal from a first sensor of a mobile computing device, wherein the first signal represents a first action of a user of the mobile computing device, and wherein the mobile computing device is in a low power state in which a presence-sensitive screen is deactivated prior to receiving the first signal from the first sensor of the mobile computing device;
    activating, based at least in part on the first signal, a second sensor of the mobile computing device;
    receiving, by the one or more processors, a second signal from the second sensor, wherein the second signal represents a second action of the user of the mobile computing device;
    activating, based at least in part on the first and second signals, an input device of the mobile computing device, wherein the input device comprises a microphone or a camera;
    receiving, by the one or more processors, a first data sample captured by the input device;
    determining, by the one or more processors, a captured template based at least in part on the first data sample, wherein the captured template comprises one or more features of the first data sample;
    comparing, by the one or more processors, the captured template to a reference template, wherein the reference template comprises one or more features of a second data sample; and
    responsive to determining that the captured template substantially matches the reference template, unlocking, by the one or more processors, the mobile computing device.

2. The method of claim 1, wherein the first sensor and the second sensor of the mobile computing device are each selected from a group consisting of a proximity sensor, a light sensor, a temperature sensor, a pressure sensor, an accelerometer, and a gyroscope.

3. The method of claim 2, wherein the first sensor is different than the second sensor.

4. The method of claim 3, wherein the second sensor comprises the accelerometer and the first sensor comprises the proximity sensor, the light sensor, or the pressure sensor.

5. The method of claim 3, further comprising:
    activating a third sensor of the mobile computing device based at least in part on the first signal and the second signal; and
    receiving, by the one or more processors, a third signal from the third sensor, wherein:
        the third signal represents a third action of the user of the mobile computing device,
        the third sensor comprises at least one of a proximity sensor, a light sensor, a temperature sensor, a pressure sensor, an accelerometer, and a gyroscope,
        the third sensor is different than the first sensor and different than the second sensor, and
        activating the input device of the mobile computing device based at least in part on the first and second signals comprises activating the input device of the mobile computing device based at least in part on the first signal, the second signal, and the third signal.

6. The method of claim 5, wherein the first sensor comprises the light sensor, the second sensor comprises the proximity sensor, and the third sensor comprises the accelerometer.

7. The method of claim 5, wherein the first sensor comprises the light sensor or the proximity sensor, the second sensor comprises the accelerometer, and the third sensor comprises the gyroscope.

8. The method of claim 1, wherein the input device comprises the camera, the method further comprising:
    activating, based at least in part on the first and second signals, the presence-sensitive screen of the mobile computing device; and
    outputting for display, at the presence-sensitive screen, image or video data captured by the camera.

9. The method of claim 1, wherein the input device comprises the camera, the method further comprising:
    receiving, a third signal from a second input device, wherein the third signal represents the user interacting with the second input device;
    activating, based at least in part on the third signal, the presence-sensitive screen;
    initiating, based at least in part on the third signal, the camera to capture image or video data; and
    outputting for display, at the presence-sensitive screen, the image or the video data.

10. The method of claim 1, wherein the first data sample includes data representing a face of the user, a fingerprint of the user, a video gesture of the user, or an eyeball retina of the user.

11. The method of claim 1, wherein the first data sample includes data representing a voice of the user.

12. The method of claim 1, further comprising:
    receiving, by the one or more processors, a third signal representing an indication from the user to unlock the mobile computing device; and
    updating, based at least in part on the third signal, an algorithm executed by the one or more processors to determine whether the input device is to be activated.

13. The method of claim 1, further comprising:
    receiving, by the one or more processors, a third signal representing an indication from the user to not unlock the mobile computing device; and
    updating, based on the third signal, an algorithm executed by the one or more processors to determine whether the input device is to be activated.

14. The method of claim 1, wherein the mobile computing device includes at least one of the one or more processors, wherein activating, based at least in part on the first and second signals, the input device of the mobile computing device comprises:
  sending, by the mobile computing device, the first and second signals to a remote computing device;
  receiving, by the mobile computing device, a command from the remote computing device to activate the input device; and
  responsive to receiving the command, activating, the input device of the mobile computing device.

15. The method of claim 1, wherein the first action is the same as the second action.

16. A mobile computing device comprising one or more processors, the one or more processors being configured to:
  receive a first signal from a first sensor, wherein the first signal represents a first action of a user of the mobile computing device, and wherein the mobile computing device is in a low power state in which a presence-sensitive screen is deactivated prior to receiving the first signal from the first sensor of the mobile computing device;
  activate, based at least in part on the first signal, a second sensor;
  receive a second signal from the second sensor, wherein the second signal represents a second action of the user of the mobile computing device; and
  activate, based at least in part on the first and second signals, a camera and a presence-sensitive screen operatively coupled to the computing device;
  output, for display at the presence-sensitive screen, image or video data captured by the camera;
  receive a first data sample captured by the camera;
  determine a captured template based at least in part on the first data sample, wherein the captured template comprises one or more features of the first data sample;
  compare the captured template to a reference template, wherein the reference template comprises one or more features of a second data sample; and
  responsive to determining that the captured template substantially matches the reference template, unlock the mobile computing device.

17. The mobile computing device of claim 16, wherein the first sensor and the second sensor are each selected from a group consisting of a proximity sensor, a light sensor, a temperature sensor, a pressure sensor, an accelerometer, and a gyroscope.

18. The mobile computing device of claim 17, wherein the second sensor comprises the accelerometer and the first sensor comprises the proximity sensor.

19. The mobile computing device of claim 16, wherein the one or more processors are further configured to:
  activate the presence-sensitive screen based at least in part on the first and second signals; and
  responsive to activating the presence-sensitive screen, output for display, at the presence-sensitive screen, image or video data captured by the camera.

20. The mobile computing device of claim 16, wherein the one or more processors are further configured to:
  receive a third signal from an input device, wherein the third signal represents the user interacting with the input device;
  activate, based at least in part on the third signal, the presence-sensitive screen;
  initiate, based at least in part on the third signal, the camera to capture image or video data; and
  responsive to initiating the camera, output for display, at the presence-sensitive screen, the image or the video data.

21. A non-transitory computer-readable storage medium comprising instructions that cause one or more processors to perform operations comprising:
  receiving a first signal from a first sensor of a mobile computing device, wherein the first signal represents a first action of a user of the mobile computing, and wherein the mobile computing device is in a low power state in which a presence-sensitive screen is deactivated prior to receiving the first signal from the first sensor of the mobile computing device;
  activating, based at least in part on the first signal, a second sensor of the mobile computing device, the second sensor being different than the first sensor;
  receiving a second signal from the second sensor, wherein the second signal represents a second action of the user of the mobile computing device;
  activating, based at least in part on the second signal, a third sensor of the mobile computing device, the third sensor being different than the first sensor and different than the second sensor;
  receiving a third signal from the third sensor, wherein the third signal represents a third action of the user of the mobile computing device;
  activating, based at least in part on the first signal, the second signal, and the third signal, a camera of the mobile computing device;
  receiving a first data sample captured by the camera;
  determining a captured template based at least in part on the first data sample, wherein the captured template comprises one or more features of the first data sample;
  comparing the captured template to a reference template, wherein the reference template comprises one or more features of a second data sample; and
  responsive to determining that the captured template substantially matches the reference template, unlocking the mobile computing device.

22. The non-transitory computer-readable storage medium of claim 21, wherein the first sensor, the second sensor, and the third sensor of the mobile computing device are each selected from a group consisting of a proximity sensor, a light sensor, a temperature sensor, a pressure sensor, an accelerometer, and a gyroscope.

23. The non-transitory computer-readable storage medium of claim 21, further comprising instructions that cause one or more processors to perform operations comprising:
  activating, based at least in part on the first, second, and third signals, the presence-sensitive screen; and
  outputting for display, at the presence-sensitive screen, image or video data captured by the camera.

24. The non-transitory computer-readable storage medium of claim 21, further comprising instructions that cause one or more processors to perform operations comprising:
  receiving, a fourth signal from a second input device, wherein the fourth signal represents the user interacting with the second input device;
  activating, based at least in part on the fourth signal, the presence-sensitive screen;
  initiating, based at least in part on the third signal, the camera to capture image or video data; and
  outputting for display, at the presence-sensitive screen, the image or the video data.

* * * * *